United States Patent
Heaton et al.

(10) Patent No.: US 7,340,219 B2
(45) Date of Patent: Mar. 4, 2008

(54) METHOD AND SYSTEM FOR MULTISITE RF TRANSCEIVER TESTING

(75) Inventors: Dale A. Heaton, Lucas, TX (US); Lianrui Zhang, Plano, TX (US); Craig Lambert, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 415 days.

(21) Appl. No.: 10/961,887

(22) Filed: Oct. 8, 2004

(65) Prior Publication Data

US 2005/0186914 A1 Aug. 25, 2005

Related U.S. Application Data

(60) Provisional application No. 60/547,402, filed on Feb. 24, 2004.

(51) Int. Cl.
*H04B 17/00* (2006.01)
(52) U.S. Cl. .................. 455/67.11; 455/67.14; 455/115.2
(58) Field of Classification Search ........... 455/67.11, 455/67.14, 333, 115.2, 226.1, 423, 115.1; 324/765, 537, 605
See application file for complete search history.

(56) References Cited

U.S. PATENT DOCUMENTS

| | | | | |
|---|---|---|---|---|
| 5,581,190 A | * | 12/1996 | Herring et al. | 324/605 |
| 6,346,907 B1 | * | 2/2002 | Dacy et al. | 341/169 |
| 6,700,388 B1 | * | 3/2004 | Mayor et al. | 324/537 |
| 6,980,611 B1 | * | 12/2005 | Marino, Jr. | 375/346 |
| 7,038,605 B2 | * | 5/2006 | Nagasaka | 341/139 |
| 7,061,276 B2 | * | 6/2006 | Xu | 327/2 |
| 2002/0171448 A1 | * | 11/2002 | Takeuchi | 324/765 |
| 2004/0143422 A1 | * | 7/2004 | Nam | 702/190 |
| 2005/0193298 A1 | * | 9/2005 | Inaba et al. | 714/726 |

OTHER PUBLICATIONS

Patent Application Entitled: *Method And Apparatus For Controlling The Positioning Of An Optical Dithering Element*, filed Feb. 17, 2004; U.S. Appl. No. 10/780,247.
Patent Application Entitled: *Method and Apparatus for Synchronizing Signals in a Testing System*, filed Jan. 30, 2004; U.S. Appl. No. 10/766,073.

* cited by examiner

*Primary Examiner*—Sonny Trinh
(74) *Attorney, Agent, or Firm*—Yingsheng Tung; Wade James Brady, III; Frederick J. Telecky, Jr.

(57) ABSTRACT

According to one embodiment of the invention, a system for testing electronic devices includes a first RF source operable to output a first signal, a second RF source operable to output a second signal, a combiner coupled to the first and second RF sources and operable to combine the first and second signals to create a third signal, one or more down converters operable to receive respective output signals from respective electronic devices and create respective down converted signals, and a set of switches operable to switch the second RF source to a local oscillator function that couples to the one or more down converters for inputting respective reference signals into the one or more down converters.

20 Claims, 1 Drawing Sheet

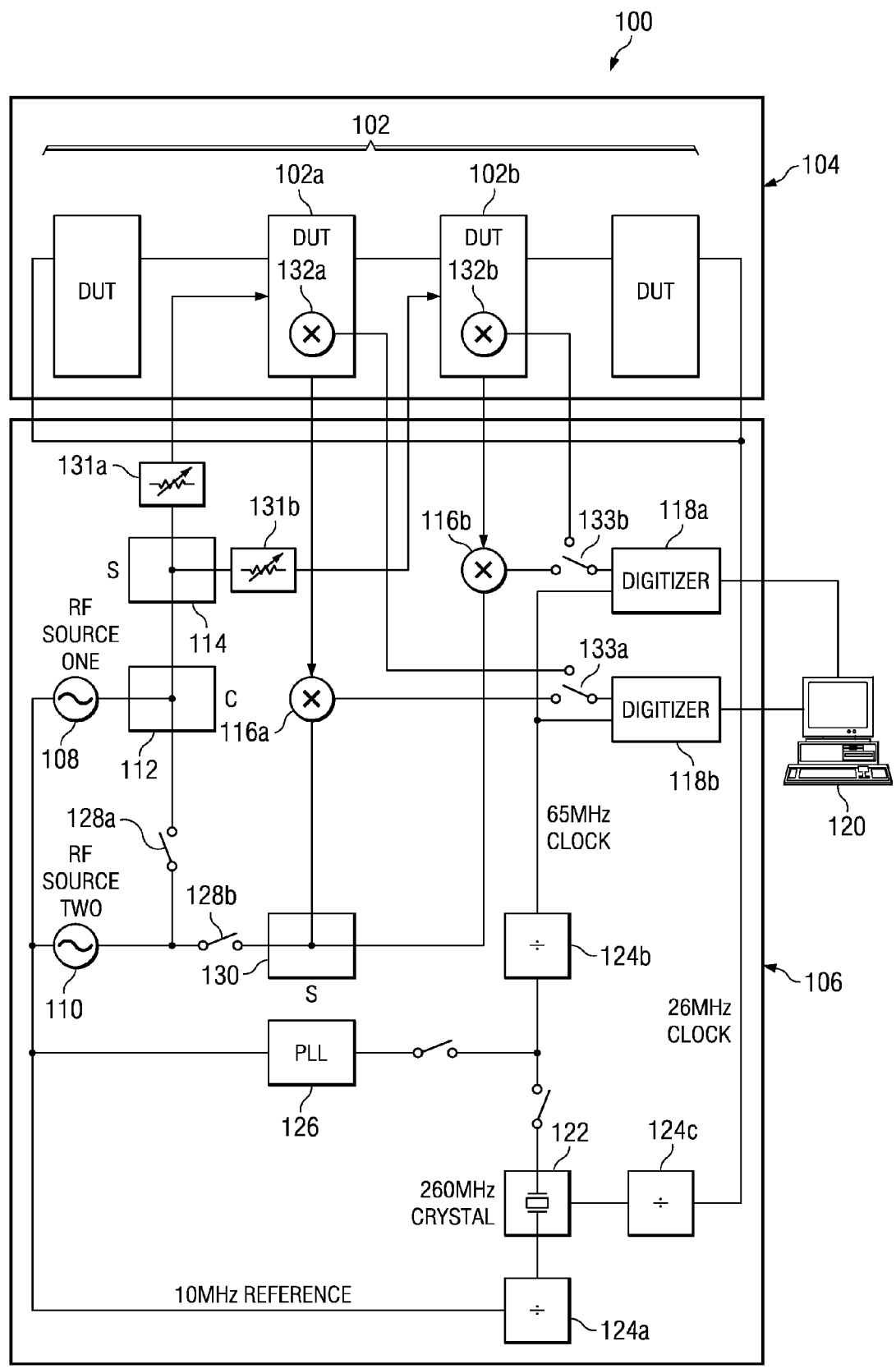

METHOD AND SYSTEM FOR MULTISITE RF TRANSCEIVER TESTING

RELATED APPLICATIONS

This application claims the benefit of Ser. No. 60/547,402, entitled "Low Cost and Fast Multisite RF Transceiver Testing using Two RF Sources," filed provisionally on Feb. 24, 2004.

TECHNICAL FIELD OF THE INVENTION

This invention relates generally to integrated circuit testing and, more particularly, to a method and system for multisite RF transceiver testing.

BACKGROUND OF THE INVENTION

Electronic devices are commonly used to make electronic products. For example, integrated circuits ("ICs") are used to carry out certain functions of cellular phones, a personal digital assistants ("PDAs"), and wireless local area networks ("WLANs"). ICs are also used to control functions of traditional mechanical devices, such as automobiles and aircraft. Because of advances in chip speed, functionality, complexity, and system-on-chip ("SOC") demand, innovative test techniques and methodologies are required for an integrated circuit manufacturer to stay competitive.

SUMMARY OF THE INVENTION

In order to be cost competitive a tester should be able to test digital functional test, digital scan, analog and power management, mixed signal audio and baseband, and now RF in a single device inserted into a device handler at probe and final test. The tester cost should also not increase significantly with the added test capability. To minimize cost for the RF test capability the RF sources are minimized by multiplexing the sources for different test functions, splitting or fanout of RF sources and multiplexing the Digitizers between baseband test (normal mixed signal tests) and the downconversion for RF testing.

According to one embodiment of the invention, a system for testing electronic devices includes a first RF source operable to output a first signal, a second RF source operable to output a second signal, a combiner coupled to the first and second RF sources and operable to combine the first and second signals to create a third signal, one or more down converters operable to receive respective output signals from respective electronic devices and create respective down converted signals, and a set of switches operable to switch the second RF source to a local oscillator function that couples to the one or more down converters for inputting respective reference signals into the one or more down converters.

Some embodiments of the invention provide numerous technical advantages. Other embodiments may realize some, none, or all of these advantages. For example, according to one embodiment, the multisite testing of RF transceivers is improved by using only two RF sources in the testing device, which decreases cost and size requirements while maintaining signal integrity. The phase noise of the sources and isolation between the transmit and receive are not compromised.

Splitting the combined or single RF source to two or more sites allows simultaneous multisite testing without adding significant cost to the hardware. Programmable attenuators may be coupled in the path to allow per site calibration of the single or combined RF source to the DUT.

The digitizers may be multiplexed between RF receiver testing using a downconversion and the direct baseband signal measured from the DUT. The RF signal from the device is down converted from the local oscillator created by the second source to the baseband signal.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 1 is a schematic diagram of a system for use in multisite RF transceiver testing according to one embodiment of the present invention.

DETAILED DESCRIPTION

Embodiments of the invention are best understood by referring to FIG. 1 of the drawings, like numerals being used for like and corresponding parts of the various drawings.

FIG. 1 is a schematic diagram of a system 100 for multisite radio frequency ("RF") transceiver testing according to one embodiment of the present invention. In the illustrated embodiment, system 100 includes a load board 104 having a plurality of devices under test ("DUTs") 102 coupled thereto, a tester 106 coupled to load board 104, and a computer 120 coupled to tester 106. Generally, system 100 is used for low-cost, fast and efficient testing of DUTs 102 and, as such, tester 106 is operable to input and/or receive from DUTs 102 certain information in a particular sequence to determine whether DUTs 102 meet particular performance standards.

Load board 104 is any suitable type of receiving device, such as a plug-in board, that is configured to receive DUTs 102 in order to operatively couple DUTs 102 to tester 106. For example, where DUTs 102 are integrated circuits, load board 104 may be a circuit board having apertures that are positioned to receive respective pins of the integrated circuits and electrically couple the pins to tester 106 through the apertures.

DUTs 102 may be any suitable electronic devices, such as integrated circuits used in cell phones, personal digital assistants, wireless local area networks, or other suitable electronic devices or systems. For example, DUTs 102 may be RF transmitters, RF receivers, RF transceivers, low noise amplifiers, voltage controlled oscillators, or other suitable electronic devices. In a particular embodiment of the invention, DUTs 102 represent any suitable RF devices, such as quadruple band GSM/GPRS RF transceivers that are used for GSM 850 MHz, GSM 900 MHz, DCS 1800 MHz, and PCS 1900 MHz for GPRS class 12 applications.

Tester 106 may be any suitable tester, such as an RF tester, that is operable to input signals into DUTs 102 via load board 104 and/or receive output signals from DUTs 102 in order to determine whether DUTs 102 meet particular performance criteria. For example, some of the criteria may be phase noise, harmonic distortion, spurs, power level, intermodulation, and other suitable performance standards. As described in further detail below, this type of information may be obtained from tester 106 and placed into usable output form by computer 120, which may be any suitable computing device that is operable to communicate information to and from tester 106. For example, computer 120 may be operable to allow a user of system 100 to input particular waveforms into DUTs 102 for transmit and/or receive mode testing. In one embodiment of the invention, computer 120 is operable to perform a fast fourier transform ("FFT") to convert a 14-bit digitized signal in the time domain to the frequency domain in order to look at particular outputs.

In the illustrated embodiment, tester 106 includes a first RF source 108, a second RF source 110, a combiner 112, a splitter 114, a pair of programmable RF attenuators 131, a pair of down converters 116, a pair of digitizers 118, a set of switches 133 for switching digitizers 118, an oscillator 122, a plurality of frequency dividers 124, a phase locked loop ("PLL") 126, a set of switches 128, and a splitter 130. The present invention contemplates more, less, or different components for tester 106 than those illustrated in FIG. 1.

According to the teachings of one embodiment of the invention, tester 106 includes only two RF sources (first RF source 108 and second RF source 110) as opposed to three or more RF sources that current RF testers possess. Having only two RF sources associated with tester 106 significantly decreases cost and size requirements for tester 106 without sacrificing functionality for tester 106. In fact, in some embodiments of the invention, tester 106 has enhanced functionality than prior art RF testers. For example, because of the use of only two RF sources, there is lower phase noise associated with tester 106. In addition, in some embodiments, tester 106 does not include an external noise source for noise figure testing where a modulated RF source can emulate the noise source.

Although first RF source 108 and second RF source 110 may be any suitable RF sources, in the illustrated embodiment, first RF source 108 includes modulation capability and second RF source 110 includes continuous wave capability. First RF source 108, may be, for example, a Rohde & Schwarz model SMV that has in-phase and quadrature (I&Q) modulation capability. Second RF source 110 may be, for example, a Rohde & Schwarz model SML that has continuous wave capability.

First RF source 108 is operable to output a first signal and second RF source 110 is operable to output a second signal. The signals may be generated by arbitrary waveform generators (not illustrated) coupled to computer 120. As described in further detail below, both RF source 108 and second RF source 110 may be phase locked by oscillator 122.

Combiner 112 is coupled to both first RF source 108 and second RF source 110 when switch 128*a* is closed. Combiner 112 is operable to combine the first and second signals from first RF source 108 and second RF source 110 to create a third signal. Splitter 114, which in the illustrated embodiment is a two-way splitter, is operable to receive the third signal and split the third signal into two or more input signals for a pair of DUTs 102*a* and 102*b*. The programmable RF attenuators 131*a*, 131*b* are programmed to calibrate the input signals into respective DUTs 102*a*, 102*b* correcting for the signal loss difference between the paths to the two DUT sites. For example, programmable RF attenuator 131*b* may be calibrated to match the same loss as the signal going to the first DUT 102*a* site from programmable RF attenuator 131*a* so that both DUT sites see the same power level.

Assuming that system 100 is in a "transmit" testing mode, DUTs 102*a*, 102*b*, in response to the input signals, send output signals to down converters 116*a*, 116*b*, respectively. Down converters 116*a*, 116*b*, in the illustrated embodiment, are superheterodyne receivers; however, down converters 116*a*, 116*b* may be any suitable electronic devices that change the frequency of a particular signal, such as demodulators, detectors, or other suitable devices. In one embodiment, down converters 116*a*, 116*b* each down convert to an intermediate frequency (base band frequency) of between 0 and 100 MHz for use by digitizers 118*a*, 118*b*. In a preferred embodiment of the invention, down converters 116*a*, 116*b* each down convert to a frequency range typically near 3 MHz but not limited to one particular frequency. The downconverted signal may be single tone, mutlitone, or a modulated signal form 0 to 100 MHz.

When system 100 is in a "receive" testing mode, DUTs 102*a*, 102*b* include their own demodulators 132*a*, 132*b*, respectively, in order to downconvert the output signals of DUTs 102*a*, 102*b* to intermediate frequency (base band frequencies) for utilization within digitizers 118*a*, 118*b*. In this mode, in one embodiment, digitizers 118*a*, 118*b* may be switched from capturing downconverted signals to capturing signals directly coupled to respective DUTs 102*a*, 102*b* via switches 133*a*, 133*b*.

Because system 100 is in a "transmit" testing mode, a local oscillator is needed for down converters 116*a*, 116*b*. Therefore, according to the teachings of one embodiment of the invention, second RF source 110 is utilized as the local oscillator by manipulation of the set of switches 128. More specifically, when second RF source 110 is desired to be used as the local oscillator, switch 128*a* is opened, and switch 128*b* is closed. Splitter 130, which in the illustrated embodiment is a two-way splitter, is utilized to split the reference signal from second RF source 110 to each down converter 116*a*, 116*b*. Down converters 116*a*, 116*b* may then take the difference of the reference signal coming from the local oscillator and the output signals from the DUTs 102*a*, 102*b* in order to obtain the intermediate frequency for digitizers 118*a*, 118*b*.

Digitizers 118*a*, 118*b* may be any suitable analog-to-digital converters that are operable to receive the intermediate frequencies from respective down converters 116*a*, 116*b* and output various digital data to computer 120 by coherent sampling of the signals. In one embodiment, the bandwidth for digitizers 118*a*, 118*b* is approximately 20 MHz; however, other suitable bandwidths are contemplated by the present invention. As described above, in one embodiment, digitizers 118*a*, 118*b*, each output a 14-bit digitized signal in time domain that can be FFT converted to frequency domain so a user of computer 120 may look at particular outputs that represent performance characteristics of DUTs 102*a*, 102*b*. For example, particular parameters that may be looked at are phase noise, harmonic distortion, spurs, power level, intermodulation, and other suitable parameters.

In order to synchronize signals within system 100, oscillator 122 is provided. Because low phase noise is desired for tester 106, oscillator 122, in one embodiment, is a crystal oscillator. Although any suitable frequency may be associated with oscillator 122, in the illustrated embodiment, a 260 MHz crystal is utilized for oscillator 122. Oscillator 122 is coupled to first RF source 108 and second RF source 110 to phase lock those devices.

In one embodiment, a divider 124*a* is utilized to divide down the 260 MHz reference signal into a 10 MHz reference signal in order to phase lock first RF source 108 and second RF source 110. Other suitable divide ratios may be utilized for divider 124*a*. In addition, digitizers 118*a*, 118*b* are phase locked by oscillator 122. In one embodiment, a reference frequency of 65 MHz (but not limited to 65 MHz) is utilized to phase lock digitizers 118*a*, 118*b* through a divider 124*b*. Other suitable divide ratios may be associated with divider 124b. DUTs 102a, 102b may also be phase locked by oscillator 122. And a divider 124c may be utilized to divide down the reference frequency of oscillator 122a to any suitable frequency; however, in the illustrated embodiment, since DUTs 102a, 102b represent integrated circuits for use in GSM phones, 26 MHz reference signal is the industry standard for these types of devices and the divide ratio for divider 126c is 10, thereby providing a 26 MHz reference clock signal for DUTs 102a, 102b.

In another embodiment of the invention, PLL 126 is utilized along with oscillator 122 to synthesize the various components of system 100 into a wide range of frequencies. Other suitable systems and methods for synchronizing the signals within system 100 are contemplated by the present invention.

Although embodiments of the invention and their advantages are described in detail, a person skilled in the art could make various alterations, additions, and omissions without departing from the spirit and scope of the present invention as defined by the appended claims.

What is claimed is:

1. A system for testing electronic devices, comprising:
   a first RF source operable to output a first signal;
   a second RF source operable to output a second signal;
   a combiner coupled to the first and second RF sources and operable to combine the first and second signals to create a third signal;
   one or more down converters operable to receive respective output signals from respective electronic devices and create respective down converted signals; and
   a set of switches operable to switch the second RF source to a local oscillator function that couples to the one or more down converters for inputting respective reference signals into the one or more down converters.

2. The system of claim 1, further comprising a splitter coupled to the combiner and operable to split the third signal into two or more input signals for respective electronic devices.

3. The system of claim 1, further comprising a load board configured to couple the respective electronic devices thereto.

4. The system of claim 3, wherein the electronic devices are each selected from the group consisting of RF receivers, RF transmitters, RF transceivers, low noise amplifiers, and voltage controlled oscillators.

5. The system of claim 3, wherein the electronic devices each operate in a frequency band between approximately 800 MHz and 1.9 GHz.

6. The system of claim 1, wherein the first RF source comprises modulation capability and the second RF source comprises continuous wave capability.

7. The system of claim 1, further comprising an oscillator operable to phase lock the first and second RF sources.

8. The system of claim 7, wherein the oscillator is a 260 MHz crystal oscillator.

9. The system of claim 7, further comprising: a first divider coupled between the oscillator and the first and second RF sources;
   a second divider coupled between the oscillator and the one or more digitizers; and
   wherein the first and second dividers have different divide ratios.

10. The system of claim 9, further comprising a phase locked loop coupled to the first divider and selectively coupled to the second divider.

11. A system for testing electronic devices, comprising:
    a tester configured to couple to a load board for testing one or more electronic components, the tester comprising:
    no more than two RF source, wherein a first one of the RF sources is operable to output a first signal and a second one of the RF sources is operable to output a second output signal;
    a combiner coupled to the first and second RF sources and operable to combine the first and second signals to create a third signal;
    a splitter coupled to the combiner and operable to split the third signal into two or more input signals for respective electronic devices;
    one or more digitizers operable to receive output signals from respective electronic devices;
    an oscillator operable to phase lock the first and second RF sources and the one or more digitizers; and
    a set of switches operable to switch the second RF source to a local oscillator function.

12. The system of claim 11, wherein the tester further comprises one or of claim 11, wherein the first RF source comprises modulation capability and the second RF source comprises continuous wave capability.

13. The system of claim 11, wherein the first RF source comprises modulation capability and the second RF source comprises continuous wave capability.

14. A system for testing electronic devices, comprising:
    a first RF source operable to output a first signal;
    a second RF source operable to output a second signal; a combiner coupled to the first and second RF sources and operable to combine the first and second signals to create a third signal;
    a splitter coupled to the combiner and operable to split the third signal into two or more signals; and
    a plurality of programmable RF attenuators coupled to the splitter for creating input signals for respective electronic devices, each programmable RF attenuator operable to calibrate a respective input signal into a respective electronic device to correct for the signal loss difference between the input signals for the respective electronic devices.

15. The system of claim 14, further comprising a load board configured to couple the respective electronic devices thereto.

16. The system of claim 15, wherein the electronic devices are each selected from the group consisting of RF receivers, RF transmitters, RF transceivers, low noise amplifiers, and voltage controlled oscillators.

17. The system of claim 15, wherein the electronic devices each operate in a frequency band between approximately 800 MHz and 1.9 GHz.

18. The system of claim 14, further comprising an oscillator operable to phase lock the first and second RF sources.

19. The system of claim 18, further comprising a divider coupled between the oscillator and the first and second RF sources.

20. The system of claim 19, further comprising a phase locked loop coupled to the divider.

* * * * *